(12) United States Patent
Fujinawa et al.

(10) Patent No.: US 9,148,036 B2
(45) Date of Patent: Sep. 29, 2015

(54) BASE MEMBER OF A MOTOR WHICH INCLUDES SPECIFIC SURFACE STRUCTURE

(71) Applicant: Nidec Corporation, Kyoto (JP)

(72) Inventors: Junzo Fujinawa, Kyoto (JP); Koji Baba, Kyoto (JP); Yuki Masumi, Kyoto (JP)

(73) Assignee: Nidec Corporation, Kyoto (JP)

( * ) Notice: Subject to any disclaimer, the term of this patent is extended or adjusted under 35 U.S.C. 154(b) by 278 days.

(21) Appl. No.: 13/770,395

(22) Filed: Feb. 19, 2013

(65) Prior Publication Data

US 2014/0026397 A1  Jan. 30, 2014

Related U.S. Application Data

(60) Provisional application No. 61/676,526, filed on Jul. 27, 2012.

(51) Int. Cl.
| | |
|---|---|
| G11B 19/20 | (2006.01) |
| G11B 33/12 | (2006.01) |
| H02K 5/22 | (2006.01) |

(Continued)

(52) U.S. Cl.
CPC .............. *H02K 5/22* (2013.01); *G11B 19/2009* (2013.01); *H02K 5/04* (2013.01); *H02K 5/225* (2013.01); *H02K 11/0073* (2013.01); *H02K 15/02* (2013.01); *H02K 15/14* (2013.01); *G11B 33/121* (2013.01); *H02K 7/14* (2013.01); *H02K 2211/03* (2013.01); *Y10T 29/49009* (2015.01); *Y10T 29/49012* (2015.01); *Y10T 29/49636* (2015.01)

(58) Field of Classification Search
USPC .................................. 360/99.15, 99.16, 99.17
See application file for complete search history.

(56) References Cited

U.S. PATENT DOCUMENTS 5,025,336 A  *  6/1991  Morehouse et al. ........ 360/99.17
5,541,787 A  *  7/1996  Jabbari et al. .............. 360/99.16

(Continued)

FOREIGN PATENT DOCUMENTS

| JP | 05-207717 A | 8/1993 |
|---|---|---|
| JP | 05-070184 U | 9/1993 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Brian Miller
(74) *Attorney, Agent, or Firm* — Keating & Bennett, LLP (57) ABSTRACT

A thin base member for use in a disk drive apparatus in which a bearing mechanism and an actuator are arranged includes a plurality of lower recess portions, a C-shaped smooth surface, and a fan-shaped recess portion. The C-shaped smooth surface is arranged in a region of an upper surface of the base member to at least partially encircle the region where the bearing mechanism is arranged and the C-shaped smooth surface has a height constant or substantially constant in a circumferential direction. At least a portion of each of the lower recess portions is provided below the C-shaped smooth surface, in which the C-shaped smooth surface has a cross section positioned at the lower recess portions to protrude in a direction toward which the upper surface of the base member faces or in a direction toward which the lower surface of the base member faces.

10 Claims, 9 Drawing Sheets

(51) Int. Cl.
  *H02K 15/14* (2006.01)
  *H02K 15/02* (2006.01)
  *H02K 5/04* (2006.01)
  *H02K 11/00* (2006.01)
  *H02K 7/14* (2006.01)

(56) References Cited

U.S. PATENT DOCUMENTS

| | | | |
|---|---|---|---|
| 5,640,290 A * | 6/1997 | Khanna et al. | 360/99.16 |
| 5,751,514 A * | 5/1998 | Hyde et al. | 360/97.21 |
| 6,011,670 A * | 1/2000 | Balsley et al. | 360/99.16 |
| 7,012,191 B1 | 3/2006 | Watanabe et al. | |
| 7,133,248 B2 * | 11/2006 | Shin et al. | 360/97.19 |
| 7,149,053 B2 * | 12/2006 | Tadepalli et al. | 360/99.16 |
| 7,312,949 B2 * | 12/2007 | Chee et al. | 360/99.15 |
| 7,583,471 B2 * | 9/2009 | Xu et al. | 360/97.11 |
| 7,616,401 B2 * | 11/2009 | Xu et al. | 360/99.16 |
| 7,652,845 B2 * | 1/2010 | Xu et al. | 360/97.12 |
| 7,974,041 B2 * | 7/2011 | Suzuki | 360/99.16 |
| 8,068,310 B2 * | 11/2011 | Joo et al. | 360/97.17 |
| 8,120,872 B2 | 2/2012 | Sekii et al. | |
| 8,363,352 B2 | 1/2013 | Kang | |
| 8,373,942 B1 * | 2/2013 | Jeon | 360/97.11 |
| 8,477,450 B2 * | 7/2013 | Choi et al. | 360/99.16 |
| 8,493,685 B2 * | 7/2013 | Choi | 360/97.11 |
| 8,755,145 B2 * | 6/2014 | Matsumoto et al. | 360/99.08 |
| 8,842,386 B1 * | 9/2014 | Hirasawa et al. | 360/99.16 |
| 2005/0088777 A1 * | 4/2005 | Chee et al. | 360/97.01 |
| 2005/0141132 A1 * | 6/2005 | Soderfelt et al. | 360/97.01 |
| 2006/0138886 A1 | 6/2006 | Ito et al. | |
| 2006/0232878 A1 * | 10/2006 | Saruta | 360/97.01 |
| 2006/0265871 A1 | 11/2006 | Ito et al. | |
| 2007/0247010 A1 | 10/2007 | Ichizaki | |
| 2007/0278880 A1 | 12/2007 | Wada et al. | |
| 2008/0019038 A1 | 1/2008 | Xu et al. | |
| 2008/0084142 A1 | 4/2008 | Ino et al. | |
| 2010/0177627 A1 | 7/2010 | Ino et al. | |
| 2012/0200957 A1 | 8/2012 | Yawata | |

FOREIGN PATENT DOCUMENTS

| | | |
|---|---|---|
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.
Saeki et al., "Base Unit", U.S. Appl. No. 13/770,374, filed Feb. 19, 2013.
Tamaoka et al., "Motor and Disk Drive Apparatus", U.S. Appl. No. 13/564,900, filed Aug. 2, 2012.
Matsumoto et al., "Base Unit, Motor and Disk Drive Apparatus", U.S. Appl. No. 13/770,355, filed Feb. 19, 2013.
Saeki et al., "Stopper, Motor, and Disk Drive Apparatus", U.S. Appl. No. 13/767,194, filed Feb. 14, 2013.
Masumi et al., "Base Plate, Base Unit, Motor, Disk Drive Apparatus and Method of Manufacturing the Base Plate", U.S. Appl. No. 13/789,974, filed Mar. 8, 2013.
Tatsumi et al., "Base Plate, Base Unit, Motor and Disk Drive Apparatus", U.S. Appl. No. 13/788,140, filed Mar. 7, 2013.
Shiraishi et al., "Motor and Disk Drive Apparatus", U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl. No. 13/785,194, filed Mar. 5, 2013.
Matsumoto et al., "Spindle Motor and Disk Drive Apparatus", U.S. Appl. No. 13/798,842, filed Mar. 13, 2013.
Sato et al., "Spindle Motor and Disk Drive Apparatus", U.S. Appl. No. 13/798,827, filed Mar. 13, 2013.
Ishino et al., "Motor and Disk Drive Apparatus", U.S. Appl. No. 13/794,864, filed Mar. 12, 2013.

* cited by examiner

Fig.9

BASE MEMBER OF A MOTOR WHICH INCLUDES SPECIFIC SURFACE STRUCTURE

BACKGROUND OF THE INVENTION

1. Field of the Invention

The present invention relates to a base member for use in a motor and a disk drive apparatus.

2. Description of the Related Art

Conventionally, a disk drive apparatus such as a hard disk drive apparatus or the like is equipped with a spindle motor for rotating a disk. The disk drive apparatus includes a disk, a housing, a stator, a FPC (Flexible Printed Circuit), and so forth. The housing includes a cover member, a base member, and so forth.

In recent years, the disk drive apparatus is required to become smaller in height and size. Particularly, in order to further reduce the height of a disk drive apparatus of a 2.5 inch 7 mm-thickness or a 2.5 inch 5 mm-thickness which are used in small-size disk drive apparatuses, it is necessary to reduce the thickness of a housing or a motor arranged within the housing. In general, the motor includes a hub, a coil, a stator core, a wiring substrate, a base member, etc. When assembling the motor, these components are arranged to axially overlap with one another. In order for the thickness of the motor to become small, these components need to be made thin. However, if an attempt is made to reduce the overall height of the motor by reducing the turn number of the coils or the lamination thickness of the stator core, the magnetic fluxes generated in the stator during the operation of the motor are reduced such that the torque constant is reduced. It is therefore impossible to obtain the torque required for rotating the disk attached to the hub.

In order to reduce the height of the motor, it is therefore necessary to reduce the thickness of the base member, among the components of the motor, which dominates a large portion of the axial dimension of the motor. However, if the base member is merely made thin, the rigidity of the base member is reduced to a great extent. As a result, if a shocking force is applied from the outside to the base member, it is likely that the base member is broken and that the disk arranged within the housing is damaged.

With a view to solve this problem, it is thinkable to employ a method in which a thickness is secured by depressing only the portion of a base member where a circuit board or an integrated circuit is arranged, accommodating the circuit board or the integrated circuit in the depressed portion, and keeping the remaining portions of the base member not depressed. However, if an attempt is made to reduce the thickness of the base member through the use of this method, the thickness of the base member becomes extremely small and the rigidity becomes reduced in the depressed portion. In addition, a difficulty in machining the base member arises and the base member may be pierced during a machining process. The present inventors have solved this problem by employing the following structure.

SUMMARY OF THE INVENTION

In accordance with preferred embodiments of the present invention, a thin base member is used in a disk drive apparatus in which a bearing mechanism and an actuator are arranged. The base member includes a plurality of lower recess portions. The lower recess portions are arranged in a region of a lower surface of the base member around a region where the bearing mechanism is arranged. The lower recess portions extend in a radial direction. A C-shaped smooth surface is arranged in a region of an upper surface of the base member around the region where the bearing mechanism is arranged. The C-shaped smooth surface has a height that does not vary in a circumferential direction. A fan-shaped recess portion is arranged in the region of the upper surface of the base member around the region where the bearing mechanism is arranged. The fan-shaped recess portion is configured to allow the actuator to come into the fan-shaped recess portion. At least a portion of each of the lower recess portions exists below the C-shaped smooth surface. The C-shaped smooth surface has a cross section positioned at the lower recess portions to protrude in an upward direction of the base member or in a downward direction of the base member.

A method for manufacturing a base member in accordance with preferred embodiments of the present invention includes a step of preparing a steel plate as a raw material, a step of forming a C-shaped planar surface on an upper surface of the steel plate and forming a lower recess portion on a lower surface of the steel plate by pressing to produce an intermediate product, a step of attaching the intermediate product to a jig in such a way that a bottom surface of the lower recess portion does not make contact with the jig, and a step of subjecting the C-shaped planar surface to cutting or grinding to thereby form a C-shaped smooth surface.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side in FIG. 1 along a center axis direction of a motor will be just referred to as "upper" and the lower side as "lower". The up-down direction is not intended to indicate the positional relationship or the orientation when the motor is installed within an actual device. The direction parallel or substantially parallel to the center axis will be referred to as "axial". The radial direction about the center axis will be just referred to as "radial". The circumferential direction about the center axis will be just referred to as "circumferential".

Figure 1:
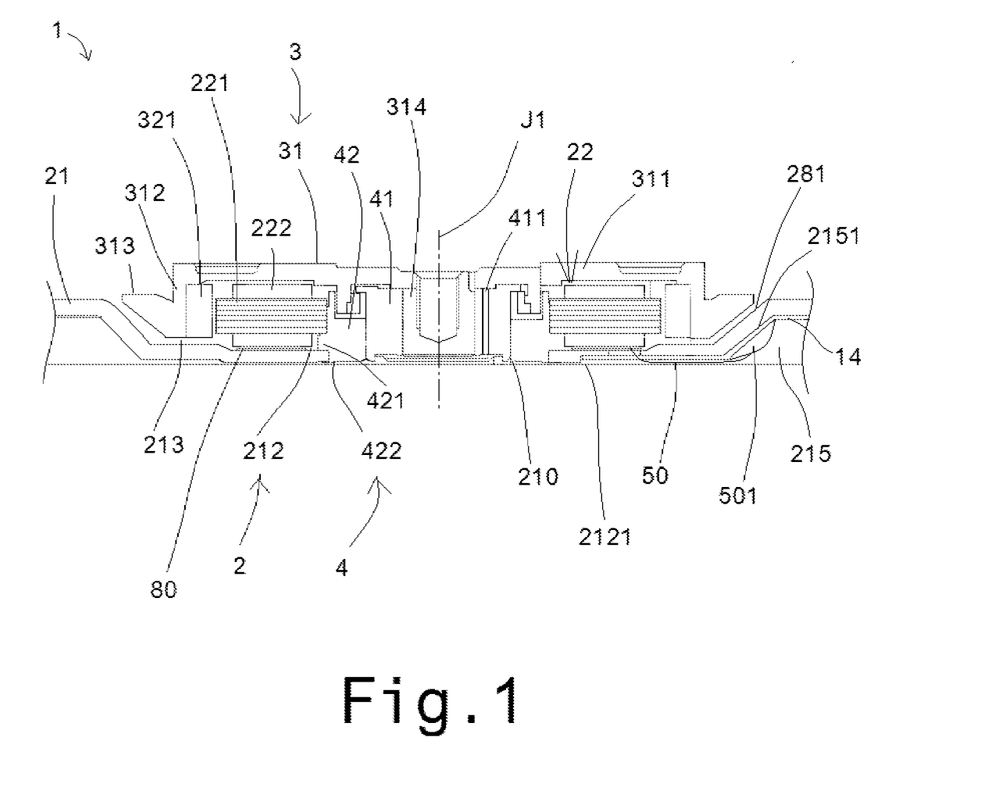
FIG. 1 is a sectional view showing a motor according to a preferred embodiment of the present invention.

FIG. 1 is a sectional view of a spindle motor 1 according to one illustrative preferred embodiment of the present invention. In the following description, the spindle motor 1 will be just referred to as "motor 1". The motor 1 is preferably used in a 2.5 inch disk drive apparatus (e.g., a hard disk drive apparatus) having a thickness of about 7 mm or less or a thickness of about 5 mm or less. The disk drive apparatus preferably includes a motor 1, a housing, at least one disk, an access unit, a connector, and so forth. The disk is attached to the motor 1. The disk drive apparatus preferably further includes an actuator (not shown), a head (not shown), an arm (not shown), and a head moving mechanism (not shown). The head comes close to the disk and performs at least one of information "reading" and "writing" tasks. The arm supports the head. Upon moving the arm, the head moving mechanism moves the head with respect to the disk. With these configurations, the head gains access to a desired position on the disk in a state that the head is kept close to the rotating disk. A base member defines a portion of the housing in cooperation with a cover member. The housing accommodates the motor 1, the disk, and the access unit therein.

As shown in FIG. 1, the motor 1 is preferably of an outer-rotor-type. In the present preferred embodiment, the motor 1 is preferably a three-phase motor having three phases, namely a U-phase, a V-phase, and a W-phase. The motor preferably includes a stationary unit 2 as a fixed assembly, a rotary unit 3 as a rotating assembly, and a fluidic dynamic-pressure bearing mechanism (hereinafter referred to as "bearing mechanism 4"). By virtue of the bearing mechanism 4, the rotary unit 3 is rotatably supported with respect to the stationary unit 2 to rotate about the center axis J1 of the motor 1.

The stationary unit 2 preferably includes a base member 21, a ring-shaped stator 22, and a wiring substrate 14. A hole portion 210 is arranged in the base member 21 to axially extend through the base member 21. A bushing 42 having a substantially cylindrical shape is inserted into the hole portion 210. The bushing 42 includes a step portion 421. The step portion 421 is a portion radially protruding from the outer surface of the bushing 42. The step portion 421 makes contact with the axial upper surface of the peripheral edge portion of the hole portion 210. Thus, the bushing 42 is positioned in place with respect to the base member 21. A plurality of caulking portions 422 protrudes radially outward from the axial lower end portion of the bushing 42. After the bushing 42 is inserted into the hole portion 210, the caulking portions 422 are plastically deformed and caulked by the application of an external force. Consequently, the bushing 42 is fixed to the base member 21.

The stator 22 preferably includes a stator core 221 and coils 222. The coils 222 are arranged in the stator core 221. In the stator 22, a plurality of lead wires 50 led out from the U, V, and W phase coils are electrically connected to the wiring substrate 14. The respective lead wires are connected to the wiring substrate 14 by, e.g., soldering. In the present preferred embodiment, the number of the lead wires 50 is three.

A flexible printed circuit board can be taken as one preferred example of the wiring substrate 14. The wiring substrate 14 is arranged on the lower surface of the base member 21. A portion of the wiring substrate 14 preferably makes contact with the lower surface of the base member 21, but may not make contact with the lower surface of the base member 21.

The stator core 221 is preferably obtained by punching, e.g., a laminated steel plate body including electromagnetic steel plates axially laminated one above another. The stator core 221 preferably includes a core-back (not shown) and a plurality of teeth (not shown). The core-back is arranged into a ring shape about the center axis J1. The step portion 421 axially makes contact with the axial lower surface of the stator core 221. Thus, the stator core 221 is positioned in place with respect to the bushing 42. The stator core 221 is preferably fixed to the outer surface of the bushing 42 by press-fitting or caulking. The outer surface of the bushing 42 is radially opposed to the inner surface of the core-back of the stator core 221.

The teeth extend radially outward from the outer circumference of the core-back. Each of the teeth preferably includes a winding portion and a tip end portion. A conductive wire is wound on the winding portion, thereby defining each of the coils 222. The tip end portion extends from the outer edge portion of the winding portion in the circumferential opposite directions.

As shown in FIG. 1, the rotary unit 3 preferably includes a rotor hub 31 and a rotor magnet 321. The rotor hub 31 preferably includes a hub body 311, a cylinder portion 312, a ring-shaped disk placing portion 313, and a shaft 314. The hub body 311 is preferably a substantially disc-shaped member. The step portion 421 is axially opposed to the hub body 311. The cylinder portion 312 protrudes downward from the outer edge portion of the hub body 311. The disk placing portion 313 extends radially outward from the lower end of the cylinder portion 312. A disk is placed on the disk placing portion 313. The rotor magnet 321 has a substantially annular shape about the center axis J1. The rotor magnet 321 is arranged inside the cylinder portion 312. The disk placing portion 313 is positioned radially outward of the lower portion of the rotor magnet 321. The rotor magnet 321 is arranged radially outward of the stator 22. In the motor 1, torque is generated between the rotor magnet 321 and the stator 22. The shaft 314 is fixed to the hub body 311. During rotation of the rotary unit 3, the shaft 314 rotates about the center axis J1.

As shown in FIG. 1, the bearing mechanism 4 is preferably a fluidic dynamic-pressure bearing and includes a lubricant, a sleeve 41, and a bushing 42. The sleeve 41 is a substantially cylindrical member. The sleeve 41 preferably includes a communication bore 411 extending through the sleeve 41 in the up-down direction. As stated above, the bushing 42 has a substantially cylindrical shape. The inner surface of the bushing 42 supports the sleeve 41. When the rotary unit 3 rotates with respect to the stationary unit 2, the sleeve 41 rotatably supports the shaft 314 through the lubricant. The kind of the bearing mechanism 4 is not particularly limited. It may be possible to use different kinds of bearings such as, for example, a ball bearing and a plain bearing.

As shown in FIG. 1, an insulating sheet 80 is arranged inside a first recess portion 212 (to be described later). The insulating sheet 80 is arranged into a substantially annular shape about the center axis J1. The insulating sheet 80 is axially opposed to the coils 222. The insulating sheet 80 is opposed to the radial outer surface of the first recess portion 212. Thus, the insulating sheet 80 is positioned in place within the first recess portion 212. It is therefore possible for the insulating sheet 80 to suppress a short-circuit even when the coils 222 make contact with the base member 21. A plurality of insulating sheets 80 may be arranged side by side along the circumferential direction so as to face the coils 222 in the axial direction. In that case, when seen in a plan view, each of the insulating sheets 80 may have a variety of shapes, e.g., a polygonal shape such as, for example, a rectangular shape or a triangular shape, a circular shape, an elliptical shape or a sector-like shape. The shape of the insulating sheets 80 is not particularly limited. The insulating sheets 80 may preferably be fixed to the base member 21 through, for example, a sticky material or an adhesive agent or may be arranged inside the first recess portion 212 without having to use the sticky material or the adhesive agent.

Figure 2:
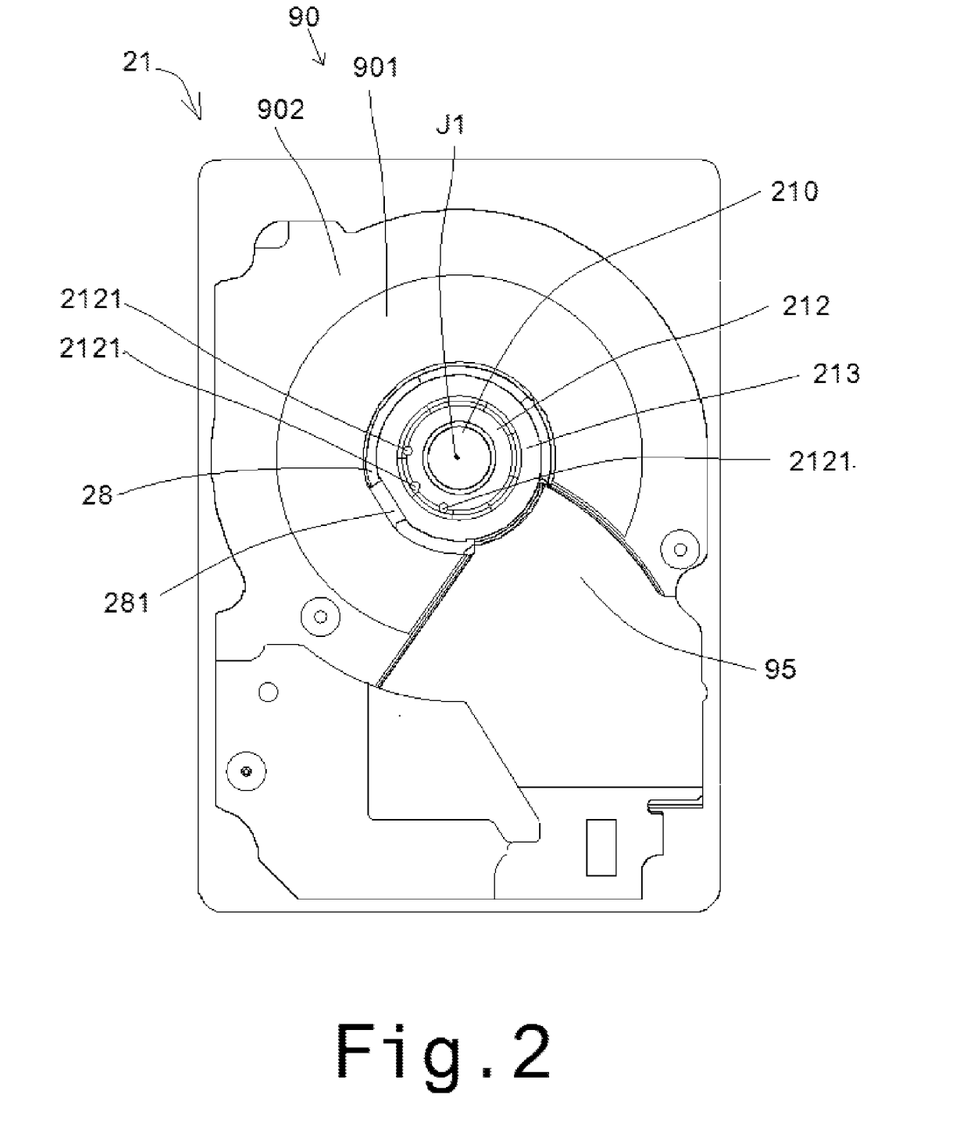
FIG. 2 is a top plan view of a base member according to a preferred embodiment of the present invention.

FIG. 2 is a plan view of the base member 21, depicting the upper surface side of the base member 21. As shown in FIG. 2, the hole portion 210 is arranged in the base member 21. A first recess portion 212 is arranged around the hole portion 210. When axially seen, the first recess portion 212 is provided as a substantially annular shape about the center axis J1. A first recess portion 212 is a portion arranged on the upper surface of the base member 21 and depressed toward the lower surface of the base member 21. A second recess portion 213 is arranged radially outward of the first recess portion 212 to extend along the first recess portion 212. The second recess portion 213 is a portion arranged on the upper surface of the base member 21 and depressed toward the lower surface of the base member 21 (axially downward). The second recess portion 213 is provided as a substantially annular shape about the center axis J1. When assembling the motor 1, the inner surface of the second recess portion 213 is axially opposed to the disk placing portion 313.

As shown in FIG. 2, at least one through-hole 2121 is preferably arranged within the first recess portion 212. The through-hole 2121 extends from the upper surface of the base member 21 to the lower surface of the base member 21. In FIG. 2, three through-holes 2121 are depicted. The respective through-holes 2121 are circumferentially spaced apart from one another. The respective through-holes 2121 are preferably arranged on a concentric circle about the center axis J1.

A protrusion portion 28 is preferably arranged on the inner surface of the second recess portion 213. The protrusion portion 28 protrudes from the lower surface of the base member 21 toward the upper surface thereof. The protrusion portion 28 extends in the circumferential direction along the inner surface of the second recess portion 213. The protrusion portion 28 preferably includes an upper slant surface 281 inclined with respect to the center axis J1.

A C-shaped smooth surface 90 and a fan-shaped recess portion 95 are preferably arranged on the upper surface of the base member 21 around the region where the bearing mechanism 4 is arranged. More specifically, the C-shaped smooth surface 90 and the fan-shaped recess portion 95 are arranged radially outward of the hole portion 210, the first recess portion 212, and the second recess portion 213. The C-shaped smooth surface 90 preferably includes a first C-shaped smooth portion 901 and a second C-shaped smooth portion 902. The C-shaped smooth surface has a substantially ring-like shape. In other words, the first C-shaped smooth portion 901 and the second C-shaped smooth portion 902 have a substantially annular shape. The first C-shaped smooth portion 901 circumferentially surrounds the second recess portion 213. The second C-shaped smooth portion 902 is positioned radially outward of the first C-shaped smooth portion 901 to circumferentially surround the first C-shaped smooth portion 901. The protrusion portion 28 adjoins the first C-shaped smooth portion 901 at least in the radial direction. The first C-shaped smooth portion 901 is positioned more axially upward than the bottom of the second recess portion 213. The second C-shaped smooth portion 902 is positioned more axially downward than the first C-shaped smooth portion 901 and is positioned more axially upward than the bottom of the second recess portion 213. The height of the C-shaped smooth surface 90 preferably does not vary substantially in the circumferential direction. In other words, the first C-shaped smooth portion 901 is substantially planar in the circumferential direction. The second C-shaped smooth portion 902 is also substantially planar in the circumferential direction. When a disk drive apparatus including the motor 1 is assembled, the C-shaped smooth surface 90 is axially opposed to the disk arranged on the disk placing portion 313.

The fan-shaped recess portion 95 is provided in a substantially fan-like shape and is depressed from the upper surface of the base member 21 toward the lower surface thereof. The fan-shaped recess portion 95 is preferably arranged radially outward of the hole portion 210, the first recess portion 212, and the second recess portion 213. When seen in a plan view, the fan-shaped recess portion 95 is circumferentially opposed to the C-shaped smooth surface 90. In other words, when seen in a plan view, the end portions of the first C-shaped smooth portion 901 are circumferentially contiguous to the fan-shaped recess portion 95. When seen in a plan view, the end portions of the second C-shaped smooth portion 902 are circumferentially contiguous to the fan-shaped recess portion 95. At least a portion of the fan-shaped recess portion 95 extends along the peripheral edge portion of the second recess portion 213. The bottom of the fan-shaped recess portion 95 is preferably positioned more axially upward than the bottom of the second recess portion 213. The bottom of the fan-shaped recess portion 95 is positioned more axially upward than the C-shaped smooth surface 90. When the disk drive apparatus is assembled, an actuator (not shown) is arranged in the fan-shaped recess portion 95. The width over which the fan-shaped recess portion 95 adjoins the second recess portion 213 is larger than the width over which the tip end of a head can move in the circumferential direction.

Figure 3:
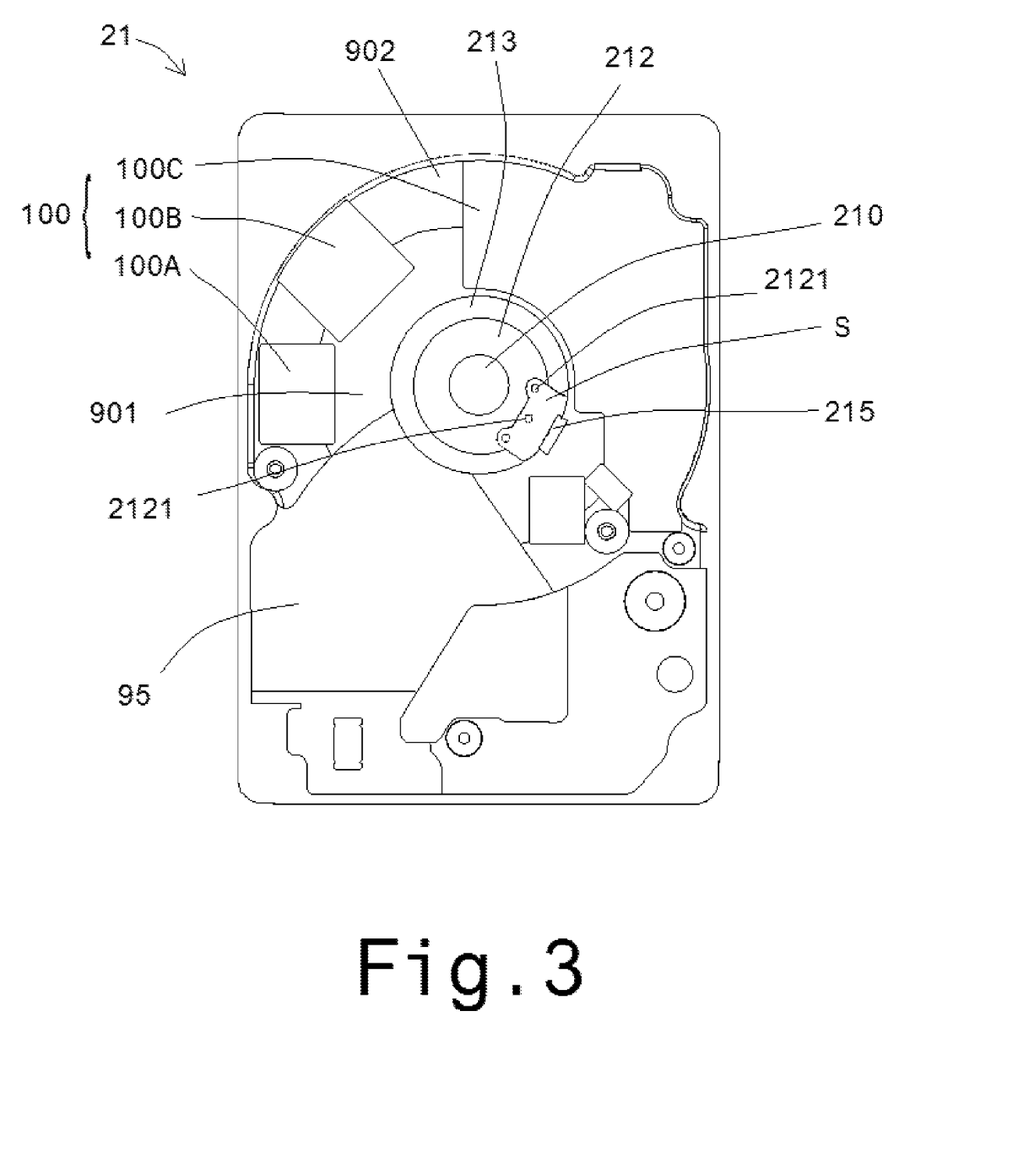
FIG. 3 is a bottom plan view of the base member according to a preferred embodiment of the present invention.

FIG. 3 is a bottom plan view of the base member 21. As shown in FIGS. 1 and 3, the bottom of the first recess portion 212 and the bottom of the second recess portion 213 preferably protrude more axially downward than the lower surface of the base member 21. The bottom of the second recess portion 213 is positioned more axially upward than the bottom of the first recess portion 212. In other words, the bottom of the first recess portion 212 protrudes more axially downward than the bottom of the second recess portion 213. The bottom of the first recess portion 212 and the bottom of the second recess portion 213 are respectively arranged into a substantially annular shape about the center axis J1. A third recess portion 215 is arranged in the peripheral edge portion of the bottom of the second recess portion 213. The third recess portion 215 is preferably depressed from the lower surface of the base member 21 toward the upper surface thereof. The circumferential position of the third recess portion 215 is substantially the same as the circumferential position of the protrusion portion 28. The radial position of the third recess portion 215 is substantially the same as the radial position of the protrusion portion 28. In the axial direction, the third recess portion 215 is positioned at the opposite side from the protrusion portion 28.

Thus, the protrusion portion 28 serves as a so-called rib. As a result, even if the thickness of the base member 21 is made small, the rigidity of the periphery of the second recess portion 213 is prevented from being reduced.

On the lower surface of the base member 21, a coplanar surface S straddling both the bottom of the first recess portion 212 and the bottom of the second recess portion 213 is preferably provided. When seen in a plan view, a plurality of through-holes 2121 is arranged in the coplanar surface S.

The third recess portion 215 preferably includes a lower slant surface 2151 inclined with respect to the center axis J1. The lower slant surface 2151 is preferably parallel or substantially parallel to the upper slant surface 281. When axially seen, the contour of the lower slant surface 2151 is substantially rectangular.

A plurality of lower recess portions 100 is arranged in a region of the lower surface of the base member 21 around a region where the bearing mechanism 4 is arranged. In the present preferred embodiment, there are arranged three lower recess portions 100 (a first lower recess portion 100A, a second lower recess portion 100B, and a third lower recess portion 100C). The respective lower recess portions 100 are positioned radially outward of the bottom of the second recess portion 213. The bottoms of the respective lower recess portions 100 are preferably positioned more axially upward than the bottom of the second recess portion 213. The respective lower recess portions 100 are arranged side by side along the circumferential direction. In FIG. 3, when the lower surface of the base member 21 is seen in a plan view, the first lower recess portion 100A, the second lower recess portion 100B, and the third lower recess portion 100C are arranged clockwise in the named order. At least one of the lower recess portions 100 is rectangular or substantially rectangular. When seen in a plan view, at least one of the lower recess portions 100 is larger in area than the remaining lower recess portions 100. More specifically, the first lower recess portion 100A and the second lower recess portion 100B of the three lower recess portions 100 are preferably substantially rectangular when seen in a plan view. The area of the third lower recess portion 100C is larger than the area of the first lower recess portion 100A and the area of the second lower recess portion 100B. The third lower recess portion 100C of the three lower recess portions 100 is radially opposed to the second recess portion 213. The third lower recess portion 100C has a region extending in the circumferential direction along the bottom of the second lower recess portion 100B. An undercut is defined in at least a portion of the peripheral edge portion of each of the lower recess portions 100.

At least a portion of each of the lower recess portions 100 exists axially downward of the C-shaped smooth surface 90. In the present preferred embodiment, the respective lower recess portions 100 are positioned at the axial opposite side from the first C-shaped smooth portion 901 and the second C-shaped smooth portion 902. A portion of each of the lower recess portions 100 radially extends across the border between the first C-shaped smooth portion 901 and the second C-shaped smooth portion 902. In the present preferred embodiment, the first lower recess portion 100A and the second lower recess portion 100B radially extend across the border between the first C-shaped smooth portion 901 and the second C-shaped smooth portion 902. On the lower recess portions 100, the C-shaped smooth surface 90 preferably has a cross section curved toward the axial upper side or the axial lower side of the base member 21. In the present preferred embodiment, the first C-shaped smooth portion 901 and the second C-shaped smooth portion 902 preferably have a cross section curved toward the axial upper side or the axial lower side of the base member 21.

Figure 4:
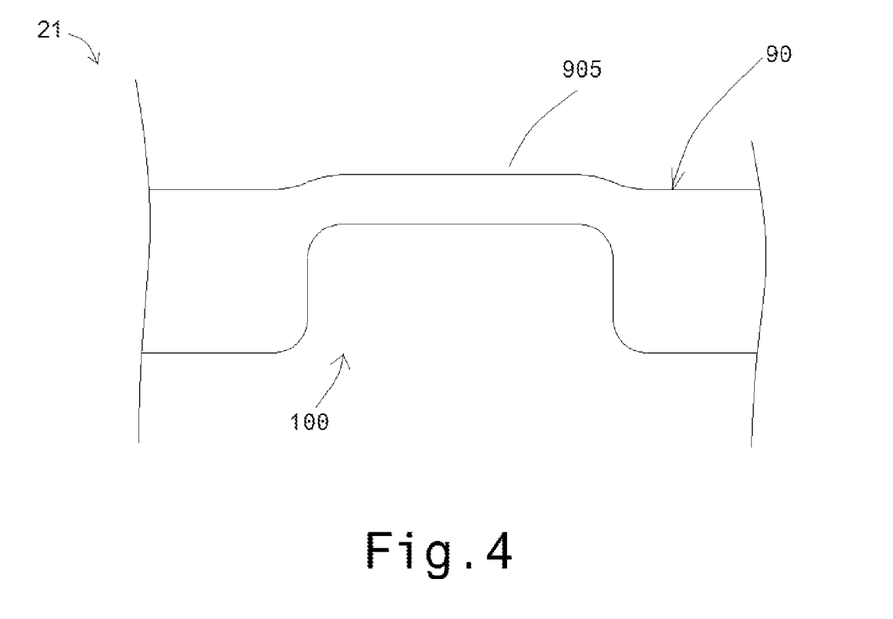
FIG. 4 is a sectional view of the base member according to a preferred embodiment of the present invention.

FIG. 4 is a sectional view of the lower recess portion 100 existing axially downward of the C-shaped smooth surface 90. As shown in FIG. 4, the C-shaped smooth surface 90 preferably has a raised portion 905 protruding axially upward such that the upper surface thereof becomes higher than the surrounding region. The raised portion 905 has such a height as not to make contact with the disk when the disk drive apparatus is assembled. The raised portion 905 is positioned at the axial opposite side from the lower recess portion 100. By employing this structure, it is possible to stably provide the raised portion 905 having a reduced thickness. In the lower recess portion 100 where the thickness of the base member 21 becomes quite small, the thickness of the base member 21 can be increased by allowing the base member 21 to have a shape bulging toward the axial opposite side just as much as the elevation of the raised portion 905. Thus, it is possible to obtain an additional effect of inhibiting a reduction of rigidity of the base member 21. The bottom of the lower recess portion 100 may be substantially flat or may partially protrude.

As shown in FIG. 1, the wiring substrate 14 is arranged on the lower surface of the base member 21. The wiring substrate 14 is preferably fixed to the lower surface of the base member 21 by a sticky material or an adhesive agent. A portion of the wiring substrate 14 is preferably arranged on the coplanar surface S. The end portion of the wiring substrate 14 is radially opposed to the bottom of the first recess portion 212. The wiring substrate 14 axially makes contact with a portion of the bottom of the first recess portion 212 and the bottom of the second recess portion 213. The wiring substrate 14 extends radially outward from the coplanar surface S toward the lower surface of the base member 21 through the third recess portion 215. The wiring substrate 14 makes contact with the lower slant surface 2151 of the third recess portion 215.

Lead wires 50 are led out from the coils 222. In the present preferred embodiment, the motor 1 is a three-phase motor. Thus, the lead wires 50 are led out one by one from a U phase, a V phase, and a W phase. The respective lead wires 50 are preferably led out from the upper surface of the base member 21 toward the lower surface thereof through the respective through-holes 2121. On the lower surface of the base member 21, the lead wires 50 run on the coplanar surface S and go toward the position where the lower slant surface 2151 exists. In the position where the lower slant surface 2151 exists, the lead wires are electrically connected to the wiring substrate 14. The lead wires 50 are connected to the wiring substrate 14 by, e.g., soldering (using a lead-containing solder or a lead-free solder). A fixing portion 501 is preferably formed by the soldering. The lower slant surface 2151 is positioned more axially upward than the bottom of the first recess portion 212 and the bottom of the second recess portion 213. For that reason, if the lead wires 50 are connected to the wiring substrate 14 in the position where the lower slant surface 2151 exists, the fixing portion 501 is positioned more axially upward than the bottom of the first recess portion 212. As a result, the thickness of the motor 1 can be kept within the thickness of the base member 21.

At least a portion of the coplanar surface S is covered with a resin member. The lead wires 55 arranged on the coplanar surface S are fixed on the coplanar surface S by the resin member. The respective through-holes 2121 are closed by the resin member. Consequently, the lead wires 50 passing through the respective through-holes 2121 are fixed within the through-holes 2121. Thus, even if a shocking force is applied from the outside to the motor 1, the lead wires 50 are prevented from being pulled away from the wiring substrate 14 or the coplanar surface S. Since the respective through-holes 2121 are closed by the resin member, dust or the like is prevented from entering the inside of the motor 1 from the outside.

Figure 5A:
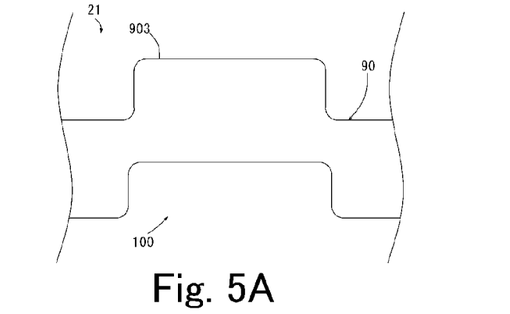
FIGS. 5A, 5B, 5C, and 5D are sectional views illustrating how to process the base member according to a preferred embodiment of the present invention.
Figure 5B:
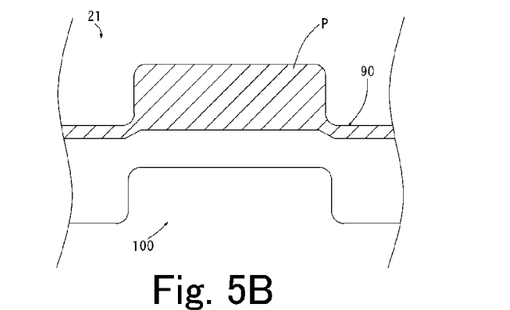
Figure 5C:
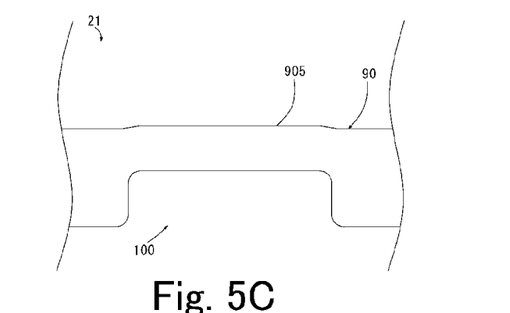
Figure 5D:
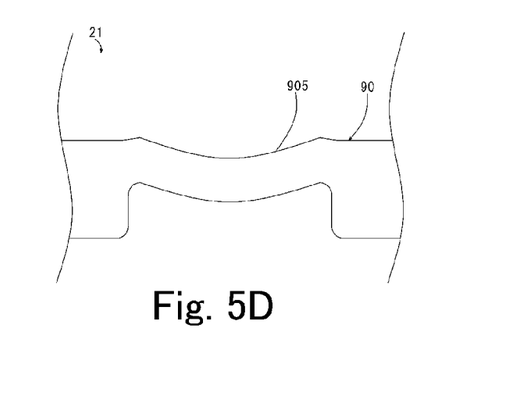
Figure 6:
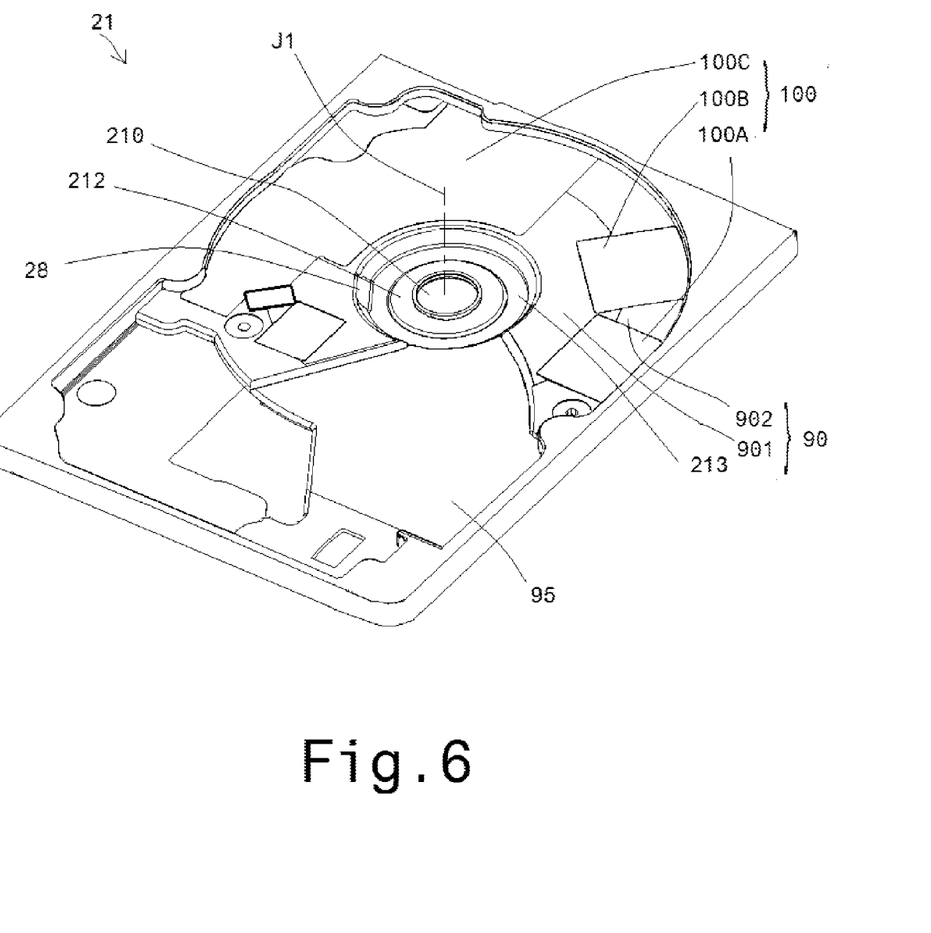
FIG. 6 is a top perspective view of the base member according to a preferred embodiment of the present invention.
Figure 7:
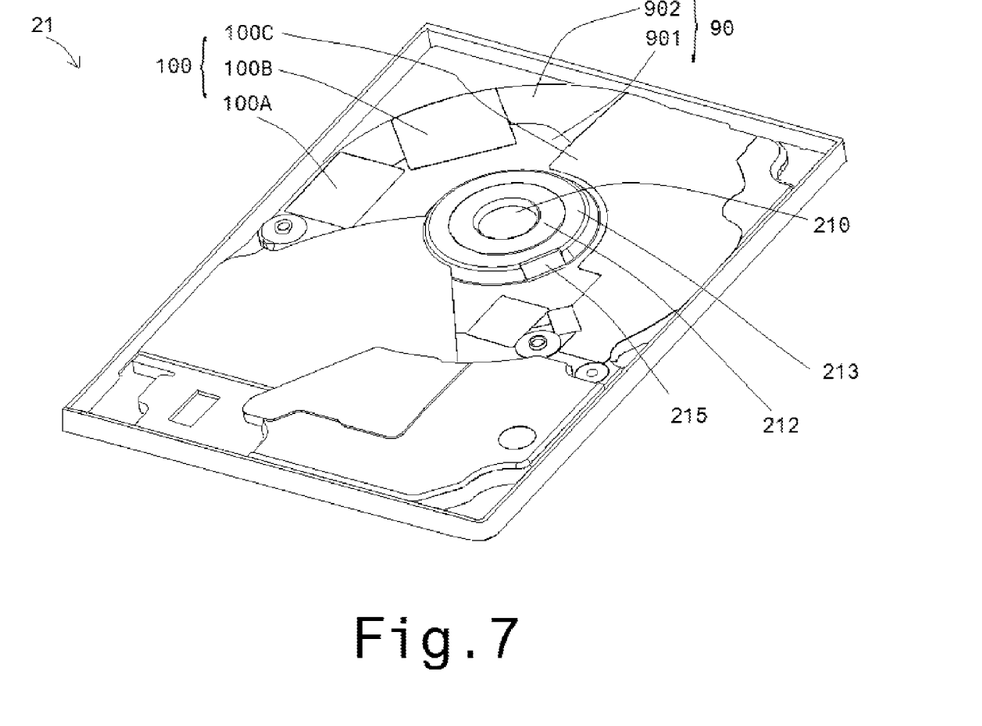
FIG. 7 is a bottom perspective view of the base member according to a preferred embodiment of the present invention.

The base member 21 is preferably formed by a process including pressing. FIGS. 5A, 5B, 5C, and 5D are views illustrating a machining process of the base member 21 in accordance with preferred embodiments of the present invention. FIG. 6 is a view showing the upper surface of the base member 21 which has been subjected to a pressing process. FIG. 7 is a view showing the lower surface of the base member 21 which has been subjected to a pressing process. First, a steel plate as a raw material is prepared. The steel plate has a substantially flat shape. The steel plate is arranged within a mold. As shown in FIG. 5A, a series of pressing is performed with respect to the raw member. Consequently, as shown in FIGS. 6 and 7, a C-shaped planar surface corresponding to the C-shaped smooth surface 90 is first formed. Then, there is formed an intermediate product of the base member 21 that includes the hole portion 210, the lower recess portions 100, the first recess portion 212, the second recess portion 213, the third recess portion 215, and so forth. During the pressing, the protrusion portion 28 positioned at the axial opposite side of the third recess portion 215 is simultaneously formed in the base member 21 with the formation of the third recess portion 215. For that reason, the shape of the protrusion portion 28 is substantially similar to the shape of the third recess portion 215. When the lower recess portions 100 are formed by the pressing, the bottoms of the respective lower recess portions 100 protrude axially upward in the region of the upper surface of the base member 21 corresponding to the C-shaped smooth surface 90. In FIG. 5A, a salient portion 903 corresponds to the bottom of each of the lower recess portions 100 protruding axially upward.

Next, the intermediate product is attached to a jig. At this time, the bottom surface of each of the lower recess portions 100 does not make contact with the jig. Then, on the C-shaped planar surface corresponding to the C-shaped smooth surface 90 of the upper surface of the base member 21, cutting or grinding is performed with respect to the substantially entire portion of the C-shaped planar surface that includes the bottom of each of the lower recess portions 100 protruding axially upward. Thus, the cut portion P hatched in FIG. 5B is removed and the C-shaped smooth surface 90 is formed on the upper surface of the base member 21. By virtue of the cutting or the grinding, a raised portion 905 protruding axially upward and having a height larger than the height of the surrounding region is formed in the region of the C-shaped smooth surface 90 positioned at the axial opposite side from the lower recess portions 100. As a result, the axial opposite surface of the base member 21 from each of the lower recess portions 100 is raised toward the axial opposite side of the base member 21 just as much as the elevation of the raised portion 905. By adopting the shape in which the thickness of the thinnest portion is increased a little bit, it is possible to stably perform the cutting or the grinding. The height of the raised portion 905 may be about 10 μm or less.

Figure 8:
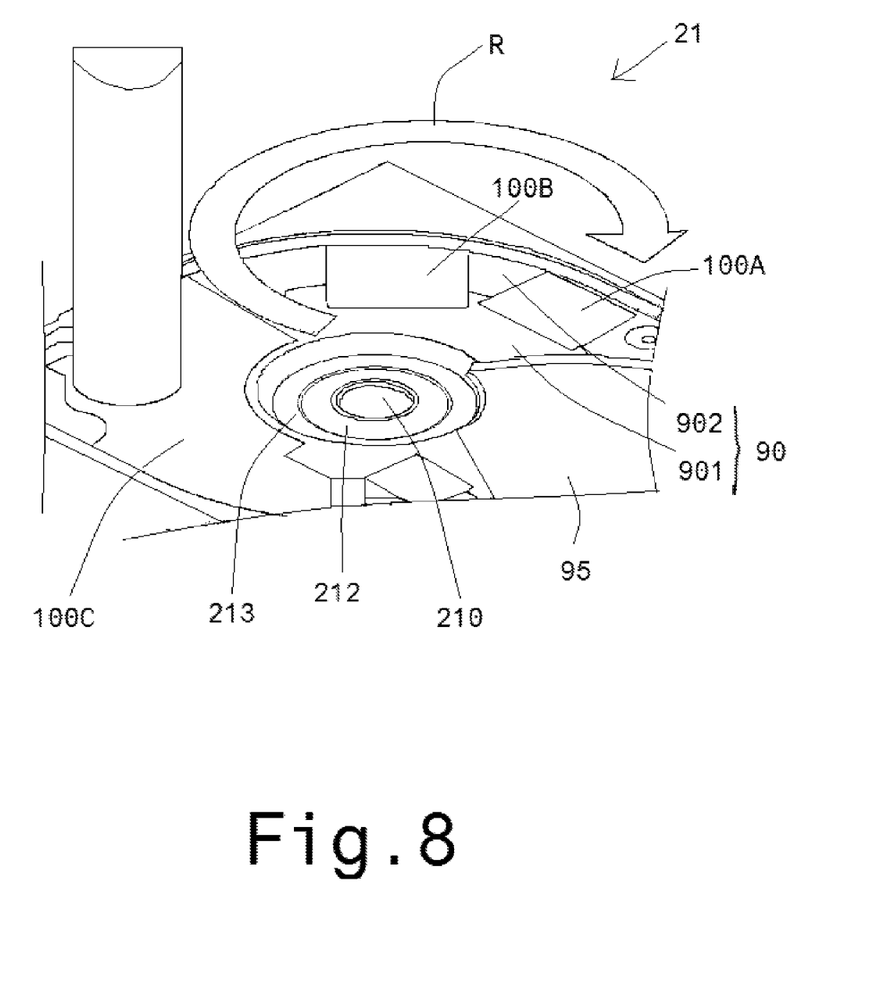
FIG. 8 is a view illustrating how to process the base member according to a preferred embodiment of the present invention.

More specifically, after the pressing, a tool comes into contact with the salient portion 903 on the C-shaped planar surface corresponding to the C-shaped smooth surface 90. The tool moves on the upper surface of the base member 21 as the intermediate product in the circumferential direction about the center axis J1, thereby cutting or grinding the C-shaped planar surface. For that reason, cutting marks or grinding marks extending in the circumferential direction are formed on the C-shaped smooth surface 90. In the present preferred embodiment, as shown in FIG. 8, the tool preferably moves clockwise in the circumferential direction (in the direction indicated by an arrow R) along the contour of the base member 21 and moves from the radial outer side toward the radial inner side. In the present preferred embodiment, the tool moves, on the region corresponding to the C-shaped smooth surface 90, from the region corresponding to the bottom of the third lower recess portion 100C toward the region corresponding to the second lower recess portion 100B and then toward the region corresponding to the first lower recess portion 100A.

Since the C-shaped smooth surface 90 is preferably formed by, for example, cutting or grinding as described above, the C-shaped smooth surface 90 becomes a surface showing little height variation in the circumferential direction. Therefore, when the disk drive apparatus is assembled, the disk is prevented from making contact with the C-shaped smooth surface 90.

For example, a bit, an end-mill, a drill, a grindstone, a grinding belt, etc. is used as the tool. However, the tool is not particularly limited. Machining methods (electric discharge machining, laser machining or spray machining) other than cutting or grinding may alternatively be used as the machining method of the base member 21. However, the machining method of the base member 21 is not particularly limited. With respect to the intermediate product, the tool may move counterclockwise in the circumferential direction or may move from the radial inner side toward the radial outer side.

On the lower surface of the base member 21, the coplanar surface S is preferably formed by cutting such as, for example, milling or the like. Thus, even if the bottom of the first recess portion 212 and the bottom of the second recess portion 213 are made thin, it is possible to avoid reduction in rigidity. As a result, it becomes possible to reduce the thickness of the disk drive apparatus including the motor 1.

Cutting or grinding may be performed in a state that the base member 21 exists within the mold, or may be performed after the intermediate product is removed from the mold. Cutting or grinding may be performed with respect to the entire upper and lower surfaces of the base member 21 and the peripheral edge portions of the first recess portion 212, the second recess portion 213, the third recess portion 215, and the hole portion 210.

In the base member 21 subjected to the pressing, undercuts or burrs are formed in the peripheral edge portions of the hole portion 210, the end portions of the through-holes 2121, and the outer edges of the base member 21 as the raw member is punched with the mold. The undercuts are formed at one side in the punching direction of the mold. The burrs are formed at the other side in the punching direction. In particular, cutting or grinding may be performed with respect to the burrs formed by the pressing. If the burrs are removed by cutting, the peripheral edge portions of the hole portion 210 and the end portions of the through-holes 2121 become smooth. Therefore, when assembling the base member 21, the components such as the stator 22 and the like are attached with no or substantially no likelihood of being damaged. By performing the pressing, an undercut is formed in the peripheral edge portion of the hole portion 210 on the lower surface of the base member 21.

Pressing may be further performed with respect to the base member 21 which has been subjected to the cutting or the grinding. As shown in FIG. 5D, if the mold presses the upper surface of the base member 21 from the axial upper side, the raised portion 905 becomes concave and protrudes axially downward. The cross section of the bottom of each of the lower recess portions 100 is curved so as to protrude axially downward. Thus, the raised portion 905 is kept within the thickness of the base member 21. This makes it possible to reduce the thickness of the base member 21 and to avoid reduction in rigidity.

Plating is preferably performed with respect to the base member 21 which has been subjected to the pressing and the cutting or the grinding. For example, nickel-based metal is preferably used as a plating metal. By virtue of the plating, the base member 21 is wholly covered with a thin film of the plating metal. The thickness of the thin film may be, e.g., from about 2 μm to about 10 μm. Accordingly, it is possible to prevent the base member 21 from being corroded by, for example, the lubricant of the bearing mechanism 4 or due to the external environment.

While the preferred embodiments of the present invention have been described above, the present invention can be modified in many other different forms.

For example, only one through-hole 2121 may be formed in the first recess portion 212. In that case, the lead wires 50 extending from the coils 222 are preferably guided to the single through-hole 2121 and are led out from the upper surface of the base member 21 to the lower surface thereof. Therefore, as compared with a case where a plurality of through-holes 2121 is arranged, it is possible to increase the rigidity of the base member 21.

Even in case where a plurality of through-holes 2121 is provided in the first recess portion 212, there may be a through-hole 2121 to which the lead wires 50 are guided and a through-hole to which the lead wires 50 are not guided. Additionally, a plurality of lead wires 50 may be guided to a single through-hole 2121 if so desired.

In the aforementioned preferred embodiment, three-phase lead wires 50 of U, V, and W phases are all connected to the wiring substrate 14. In that case, a common wire is preferably connected to the three lead wires 50 at the side of the stator 22 but is not directly connected to the wiring substrate 14. Alternatively, the common wire may be connected to the wiring substrate 14 in place of the stator 22. In that case, the number of the through-holes 2121 arranged in the first recess portion 212 can be set equal to four, including the ones for the three lead wires 50 and the one for the common wire. As long as short circuit or mutual contact is prevented, the common wire or one of the three lead wires 2121 may be arranged within the same through-hole 2121 together with the remaining lead wires 50. This configuration makes it possible to reduce the number of the through-holes 2121. As a result, it is possible to minimize the reduction of rigidity of the base member 21 otherwise caused by the formation of the through-holes 2121.

When seen axially, the through-holes 2121 preferably have an identical or substantially identical contour. However, the through-holes 2121 may differ in contour from one another. The through-holes 2121 may differ in size and orientation from one another. For example, the first through-hole 2121, the second through-hole 2121, and the third through-hole 2121 may not be arranged on a concentric circle about the center axis J1. Additionally, the positions of the first through-hole 2121, the second through-hole 2121, and the third through-hole 2121 may be deviated from the concentric circle. Also, adjoining ones of the through-holes 2121 may communicate with each other.

In the aforementioned preferred embodiment, there is arranged only one protrusion portion 28. However, the number of the protrusion portion 28 is not limited to one. A plurality of protrusion portions 28 may be arranged within the first recess portion 212. In that case, a plurality of third recess portions 215 is preferably arranged on the lower surface of the base member 21 in the positions corresponding to the positions of the protrusion portions 28. Each of the protrusion portions 28 may have an upper slant surface 281. There may be arranged a protrusion portion 28 including an upper slant surface 281 and a protrusion portion 28 including no upper slant surface 281. Among the plurality of third recess portions 215, the third recess portion 215 corresponding to the protrusion portion 28 including the upper slant surface 281 may have a lower slant surface 2151. Alternatively, the third recess portion 215 corresponding to the protrusion portion 28 including no upper slant surface 281 may not have a lower slant surface 2151.

The upper slant surface 281 of the protrusion portion 28 may be a surface inclined at a right angle with respect to the center axis J1. The lower slant surface 2151 of the third recess portion 215 may be a surface inclined at a right angle with respect to the center axis J1. In that case, the protrusion portion 28 and the third recess portion 215 are preferably arranged in a step shape.

The coplanar surface S may not be completely covered with the resin member. Instead, only the portions of the coplanar surface S where the through-holes 2121 are arranged may be covered with the resin member. Even in this case, the through-holes 2121 are preferably closed by the resin member. Thus, the lead wires 50 are fixed within the through-holes 2121. Dust or the like is prevented from infiltrating into the motor 1 from the outside through the through-holes 2121.

The coplanar surface S may be covered with a sealing member such as, for example, a sticky material or the like in place of the resin member. Even in this case, the through-holes are closed by the sealing member. Therefore, dust or the like is preferably prevented from infiltrating into the motor. The sealing member is preferably provided with holes through which the lead wires 50 pass. Preferably, the sealing member has an insulating property.

As stated above, the motor 1 is preferably a three-phase motor. However, the number of phases of the motor need not be particularly limited. For example, it may be possible to employ a single-phase motor or a multiple-phase motor such as, for example, a five-phase motor or a seven-phase motor. The number of the through-holes 2121 arranged in the first recess portion 214 may be changed in conformity with the number of the lead wires or the handling method of the common wire.

Figure 9:
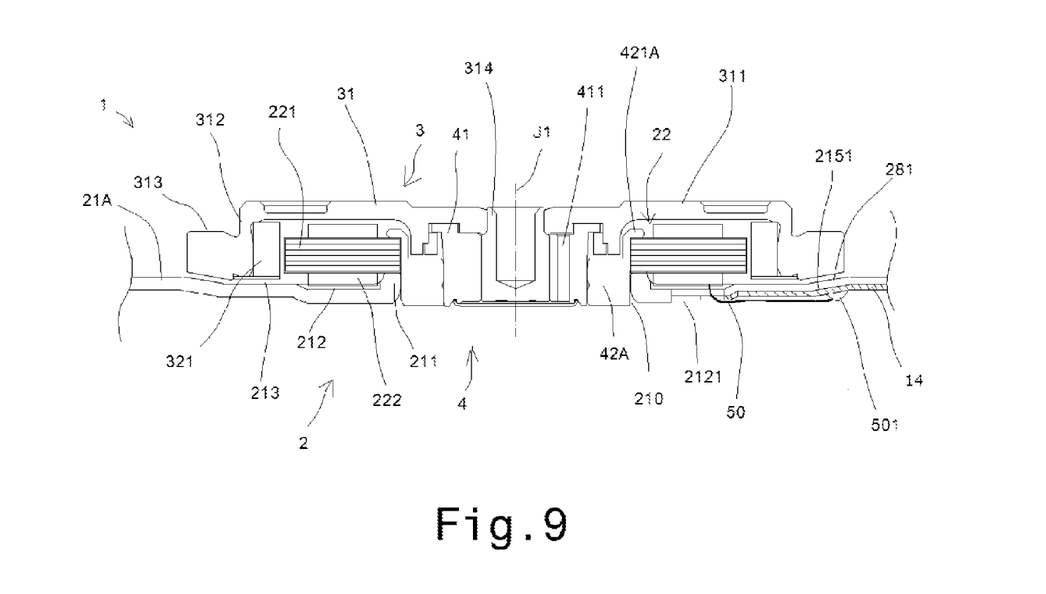
FIG. 9 is a section view of a motor according to a modified example of a preferred embodiment of the present invention.

The base member 21 may include a tubular portion 211. FIG. 9 is a view showing a modified example of a base member in accordance with a preferred embodiment of the present invention. The tubular portion 211 having a substantially cylindrical shape is arranged substantially at the center of the base member 21A. On the upper surface of the base member 21A, the tubular portion 211 axially extends from the edge of the hole portion 210. The stator 22 is arranged around the tubular portion 211. The bushing 42A is a substantially cylindrical member. The stator core 221 is preferably fixed to the outer surface of the bushing 42A by, for example, press-fitting or caulking. The bushing 42A is preferably fixed to the inner surface of the tubular portion 211 by, for example, press-fitting or the like. A step portion 421A is arranged on the outer surface of the bushing 42A. The step portion 421A is axially opposed to the hub body 311. The stator core 221 preferably axially makes contact with the step portion 421A. The bushing 42A is preferably, for example, press-fitted to the stator core. The outer surface of the bushing 42A is radially opposed to the inner surface of the core-back of the stator core 221.

The base member 21A is preferably formed by, for example, pressing, cutting, grinding, etc. Other structures of the base member 21A preferably remain the same as the structures of the aforementioned base member 21.

In the structures described above, the lead wires 50 are preferably soldered to the wiring substrate 14 in the position of the lower side of the base member 21 where the lower slant surface 2151 is present. However, the lead wires 50 need not be necessarily soldered in the position where the lower slant surface 2151 of the base member 21 is arranged. In other words, the fixing portion 501 may be positioned radially outward of the portion where the third recess portion 215 is arranged. On the lower surface of the base member 21, the portion existing radially outward of the third recess portion 215 and the second recess portion 213 is a flat portion. In the flat portion, it is therefore easy to press the wiring substrate 14 against the base member 21. As a result, the task of soldering the lead wires 50 to the wiring substrate 14 can be performed with ease.

The motor 1 of the aforementioned preferred embodiment is preferably a three-phase motor. However, the number of phases of the motor 1 need not be particularly limited. For example, it may be possible to employ a single-phase motor or a multiple-phase motor such as, for example, a five-phase motor or a seven-phase motor.

The C-shaped smooth surface 90 may be provided with only the first C-shaped smooth portion 901. The second C-shaped smooth portion 902 may not be necessarily formed into a substantially ring-like shape and may include a plurality of surfaces arranged in the circumferential direction. The raised portion 905 may not necessarily have a curved cross section but may have an irregular or rectilinear cross section. The raised portion 905 may be bulged toward at least one of the axial upper side and the axial lower side. The raised portion 905 may not be provided on the C-shaped smooth surface 90. One or more raised portions 905 may be arranged on the C-shaped smooth surface 90 or on the bottom of each of the lower recess portions. The size and position of the raised portions 905 is not particularly limited.

The present invention can be used in a motor for a disk drive apparatus or in a motor for other applications than the disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A thin base member for use in a disk drive apparatus in which a bearing mechanism and an actuator are arranged, the base member comprising:
a plurality of lower recess portions;
a C-shaped smooth surface; and
a fan-shaped recess portion; wherein
the plurality of lower recess portions are arranged in a region of a lower surface of the base member to at least partially encircle a region where the bearing mechanism is arranged, the plurality of lower recess portions extending in a radial direction and being recessed in an axially upward direction from the lower surface of the base member;
the C-shaped smooth surface is arranged in a region of an upper surface of the base member, provided on a side of the base member opposite to the lower surface of the base member, around the region where the bearing mechanism is arranged, the C-shaped smooth surface having a height substantially constant in a circumferential direction,
the fan-shaped recess portion is arranged in the region of the upper surface of the base member around the region where the bearing mechanism is arranged, the fan-shaped recess portion being arranged to allow the actuator to come into the fan-shaped recess portion; and
at least a portion of each of the plurality of lower recess portions is provided axially below the C-shaped smooth surface, the C-shaped smooth surface having a cross section positioned at the plurality of lower recess portions to protrude in a direction toward which the upper surface of the base member faces or to depress in a direction toward which the lower surface of the base member faces.

2. The base member of claim 1, further including:
a hole portion including a center axis;
a first recess portion arranged on the upper surface of the base member and depressed toward the lower surface of the base member around the hole portion, the first recess portion including a bottom arranged at the side of the lower surface of the base member; and
a second recess portion arranged radially outward of the first recess portion on the upper surface of the base member to extend along the first recess portion, the second recess portion including a bottom depressed toward the lower surface of the base member; wherein
the C-shaped smooth surface is arranged radially outward of the second recess portion.

3. The base member of claim 2, wherein the C-shaped smooth surface includes a first C-shaped smooth portion surrounding the second recess portion when seen in a plan view and a second C-shaped smooth portion arranged radially outward of the first C-shaped smooth portion to surround the first C-shaped smooth portion when seen in a plan view.

4. The base member of claim 3, wherein the fan-shaped recess portion is circumferentially opposed to the first C-shaped smooth portion and the second C-shaped smooth portion when seen in a plan view.

5. The base member of claim 1, wherein the plurality of lower recess portions include a first lower recess portion, a second lower recess portion, and a third lower recess portion which are arranged clockwise in the named order on the lower surface of the base member.

6. The base member of claim 5, wherein the third lower recess portion is larger in area than the first lower recess portion and the second lower recess portion when seen in a plan view.

7. The base member of claim 5, wherein the first lower recess portion and the second lower recess portion have a substantially rectangular contour when seen in a plan view.

8. The base member of claim 3, wherein the first lower recess portion and the second lower recess portion extend across a border line between the first C-shaped smooth portion and the second C-shaped smooth portion.

9. A motor, comprising:
the base member of claim 1;
a stator arranged in the base member;
a rotor arranged to rotate with respect to the stator about a center axis; and
a wiring substrate electrically connected to the stator.

10. A disk drive apparatus, comprising:
the motor of claim 9;
at least one disk held and rotated by the motor; and
a housing arranged to accommodate the motor and the disk.

* * * * *